United States Patent
Tabares et al.

(10) Patent No.: US 10,139,816 B2
(45) Date of Patent: Nov. 27, 2018

(54) DEVICE FOR MANEUVERING GROUND SUPPORT EQUIPMENT ON AN AIRPORT STAND

(71) Applicant: AIRBUS (S.A.S.), Blagnac (FR)

(72) Inventors: Diego Alonso Tabares, Toulouse (FR); Nicolaas Peter Esteie, Tournefeuille (FR); Alexandre Fouillot, Toulouse (FR)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 15/246,090

(22) Filed: Aug. 24, 2016

(65) Prior Publication Data

US 2017/0060127 A1 Mar. 2, 2017

(30) Foreign Application Priority Data

Aug. 25, 2015 (FR) ...................................... 15 57903

(51) Int. Cl.
*G05D 1/00* (2006.01)
*B60W 30/06* (2006.01)
(Continued)

(52) U.S. Cl.
CPC .......... *G05D 1/0011* (2013.01); *B60L 3/0046* (2013.01); *B60L 3/12* (2013.01);
(Continued)

(58) Field of Classification Search
CPC ......... G05D 1/0011; B64F 1/32; B64F 1/368; B64F 1/228; B60D 2001/005;
(Continued)

(56) References Cited

U.S. PATENT DOCUMENTS 3,495,677 A * 2/1970 Wilson ................. G05D 1/0261
180/168
3,497,092 A * 2/1970 McIntyre .............. B60P 1/6445
414/495
(Continued)

FOREIGN PATENT DOCUMENTS

DE 10 2010 006653 A1 8/2011
DE 10 2011 111382 A1 2/2013
(Continued)

OTHER PUBLICATIONS

French Search Report for FR 1557902 dated Jun. 14, 2016.
(Continued)

*Primary Examiner* — James A Shriver, II
*Assistant Examiner* — Steve Clemmons
(74) *Attorney, Agent, or Firm* — Greer, Burns & Crain, Ltd.

(57) ABSTRACT

A device for maneuvering ground support equipment on an airport stand. Included in the device are a moving apparatus having a system for coupling with the ground support equipment, configured for maneuvering the ground support equipment according to a predetermined trajectory; and a remote control configured for remotely controlling the movements of the moving apparatus according to the predetermined trajectory. The device also relates to an item of ground support equipment on an airport stand which includes a connecting plate configured for being coupled to a moving apparatus of the device.

10 Claims, 2 Drawing Sheets

(51) Int. Cl.
  *B64F 1/315* (2006.01)
  *B64F 1/36* (2017.01)
  *B60L 3/00* (2006.01)
  *B60L 3/12* (2006.01)
  *B60L 11/18* (2006.01)
  *B60D 1/00* (2006.01)

(52) U.S. Cl.
  CPC ....... *B60L 11/1805* (2013.01); *B60L 11/1816* (2013.01); *B60L 11/1861* (2013.01); *B60W 30/06* (2013.01); *B64F 1/315* (2013.01); *B64F 1/368* (2013.01); *B60D 2001/005* (2013.01); *B60L 2200/40* (2013.01); *B60L 2200/44* (2013.01); *B60L 2240/622* (2013.01); *B60L 2250/16* (2013.01); *Y02P 90/60* (2015.11); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/14* (2013.01); *Y02T 90/16* (2013.01); *Y02T 90/162* (2013.01)

(58) Field of Classification Search
  CPC ... B62B 5/0076; B62B 5/0089; B62B 3/0612; B60P 1/6445
  See application file for complete search history.

(56) References Cited

U.S. PATENT DOCUMENTS

| | | | | |
|---|---|---|---|---|
| 3,647,014 A * | 3/1972 | Wilke | ............... | A61G 12/00 180/14.1 |
| 4,077,535 A * | 3/1978 | Oriol | ............... | A61G 12/001 180/14.1 |
| 4,219,186 A * | 8/1980 | Brewer | ............... | B62B 3/04 254/9 C |
| 4,277,079 A * | 7/1981 | Propst | ............... | B60D 1/00 180/14.1 |
| 5,078,340 A | 1/1992 | Anderberg | | |
| 5,381,987 A * | 1/1995 | Carns | ............... | B64F 1/22 123/142.5 R |
| 5,672,947 A * | 9/1997 | Hisada | ............... | G05D 1/0263 318/580 |
| 6,000,486 A * | 12/1999 | Romick | ............... | B62B 3/008 180/209 |
| 6,220,379 B1 | 4/2001 | Schugt et al. | | |
| 6,305,484 B1 * | 10/2001 | Leblanc | ............... | B60T 7/16 180/167 |
| 6,481,521 B2 * | 11/2002 | Sugiyama | ............... | B61B 10/04 180/168 |
| 6,650,975 B2 * | 11/2003 | Ruffner | ............... | A01B 69/008 342/357.57 |
| 6,672,601 B1 * | 1/2004 | Hofheins | ............... | A47F 10/06 280/47.34 |
| 7,712,556 B2 * | 5/2010 | Hammonds | ............... | B62D 11/06 180/209 |
| 7,871,234 B2 * | 1/2011 | Yuyama | ............... | A61G 12/001 280/33.997 |
| 7,991,521 B2 * | 8/2011 | Stewart | ............... | G01C 21/00 180/170 |
| 8,903,568 B1 | 12/2014 | Wang et al. | | |
| 9,273,478 B2 * | 3/2016 | Carr | ............... | B60P 1/02 |
| 9,519,284 B2 * | 12/2016 | Wurman | ............... | G05B 19/4189 |
| 9,581,983 B2 * | 2/2017 | Kilibarda | ............... | G05B 15/02 |
| 9,864,371 B2 * | 1/2018 | Douglas | ............... | G05D 1/0027 |
| 2006/0210382 A1 * | 9/2006 | Mountz | ............... | B60D 1/465 414/498 |
| 2008/0083851 A1 | 4/2008 | Perry et al. | | |
| 2010/0104414 A1 * | 4/2010 | Chilson | ............... | B61B 10/04 414/800 |
| 2012/0191269 A1 | 7/2012 | Chen et al. | | |
| 2012/0191272 A1 * | 7/2012 | Andersen | ............... | G06Q 10/087 701/2 |
| 2012/0215393 A1 | 8/2012 | Schiedegger | | |
| 2014/0222252 A1 | 8/2014 | Matters et al. | | |
| 2016/0067130 A1 * | 3/2016 | Kofoed | ............... | A61G 7/08 414/800 |

FOREIGN PATENT DOCUMENTS

| | | | | |
|---|---|---|---|---|
| EP | 1352815 A1 * | 10/2003 | ............ | B60D 1/00 |
| WO | WO-2016195596 A1 * | 12/2016 | ............ | B60D 1/02 |

OTHER PUBLICATIONS

Applicant's co-pending U.S. Appl. No. 15/246,080, titled "Device for Maneuvering and Immoblizing an Aircraft on the Ground" filed Aug. 24, 2016. (Similar subject matter).

\* cited by examiner

DEVICE FOR MANEUVERING GROUND SUPPORT EQUIPMENT ON AN AIRPORT STAND

CROSS-REFERENCE

The present application claims priority to a French Patent Application No. 1557903 filed Aug. 25, 2015 under 35 U.S.C. § 119(a) and 365(b), which is incorporated herein by reference in its entirety.

FIELD OF THE INVENTION

The present invention generally relates to equipment control devices, and in particular relates to a device for maneuvering ground support equipment on an airport stand.

BACKGROUND OF THE INVENTION

When an aircraft is immobilized on an airport stand, numerous items of ground support equipment (Ground Support Equipment), such as, for example, baggage trolleys and mobile stairways for the passengers, are brought close to the aircraft.

According to one embodiment, these various items of ground support equipment each comprise a hitch for connecting them to a tractor vehicle.

In operation, various items of support equipment are each pulled by a tractor vehicle moving in a concomitant manner on a limited area, close to the aircraft. The footprint of these various items of ground support equipment hitched to their tractor vehicles is relatively large.

The combination of these factors (large footprint, proximity of these numerous items of equipment) results in increasing the risk of incidents such as collisions between two items of ground support equipment or between an item of ground support equipment and the aircraft or a ground crew member.

In order to reduce the footprint, according to a second embodiment, each item of ground support equipment can be motorized. This solution is not satisfactory because it results in greatly increasing the purchase and maintenance costs of these items of equipment.

SUMMARY OF THE INVENTION

The purpose of the present invention is therefore to overcome the disadvantages of the prior art.

For this purpose, the invention relates to a device for maneuvering ground support equipment on an airport stand. According to the invention, the device comprises: a moving apparatus comprising a system for coupling with the ground support equipment, configured for maneuvering the ground support equipment according to a predetermined trajectory; and a remote control, configured for remotely controlling the movements of the moving apparatus according to the predetermined trajectory.

According to the invention, the same moving apparatus can be coupled successively to different items of ground support equipment. Consequently, the latter do not each need dedicated motorization and are only equipped with a coupling system. This modification does not have too great an impact on the purchase and maintenance costs of the items of ground support equipment thus equipped.

Preferably the device comprises a connecting plate integral with the ground support equipment, to which the coupling system of the moving apparatus is coupled.

Thus, by adding a connecting plate to the existing items of ground support equipment, it is possible to implement the invention with little cost.

Advantageously, the moving apparatus has dimensions allowing it to be positioned under the connecting plate of an item of ground support equipment.

Because of this, the moving apparatus being positioned under the ground support equipment, the footprint of the assembly is small, which limits the risk of incidents.

Advantageously, the coupling system comprises at least one centering pin which is mobile between a retracted position in which the centering pin is entirely housed inside a reinforcement with respect to an outer surface of the moving apparatus and a deployed position in which the centering pin protrudes with respect to the outer surface in such a way as to obtain a coupling of the moving apparatus and the ground support equipment.

This configuration makes it possible to know the position of the ground support equipment with respect to the moving apparatus perfectly.

Preferably, the coupling system comprises at least one platform configured for moving between a low position and a high position in which the platform applies an upward force on the ground support equipment.

This configuration makes is possible to slightly raise the ground support equipment and to deactivate a possible braking system of the equipment. Moreover, this makes it possible to reinforce the coupling and to increase the grip of the moving apparatus on the ground.

Advantageously, the moving apparatus comprises an upper face with at least one rib perpendicular to a forward or backward direction of movement of the moving apparatus, configured for cooperating with a groove in the ground support equipment.

This configuration makes it possible to increase the contact areas between the moving apparatus and the ground support equipment in planes perpendicular to the forward or backward direction of movement of the moving apparatus.

According to another feature, the moving apparatus comprises at least one positioning sensor and the device comprises at least software which allows a controller, on the basis of information transmitted by the remote control and/or by the positioning sensors, to control the system for moving the moving apparatus. This solution allows a moving apparatus to move autonomously.

According to another feature, the moving apparatus comprises at least one connection with an item of ground support equipment for providing an exchange of information between the moving apparatus and the ground support equipment and/or for supplying the ground support equipment with electrical energy.

The invention also relates to ground support equipment equipped with a connecting plate configured for being coupled with a moving apparatus of a maneuvering device.

Preferably, the connecting plate is positioned in the bottom part of the ground support equipment and comprises a lower face and parallel first and second flanges extending from the lower face towards the ground.

Advantageously, the connecting plate comprises at least one housing configured for receiving a centering pin integral with the moving apparatus.

According to one embodiment, the connecting plate comprises at least one groove configured for receiving a rib of the moving apparatus.

The foregoing and other aspects and features of the invention will become apparent to those of reasonable skill

DETAILED DESCRIPTION OF THE PREFERRED EMBODIMENTS

Preferred embodiments of the present invention are described below by way of example only, with reference to the accompanying drawings. Further, the following description is merely exemplary in nature and is in no way intended to limit the invention, its application, or uses. As used herein, the term "software," "module," or "unit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. Thus, while this invention includes particular examples and arrangements, the scope of the present invention should not be so limited since other modifications will become apparent to the skilled practitioner.

Figure 1:
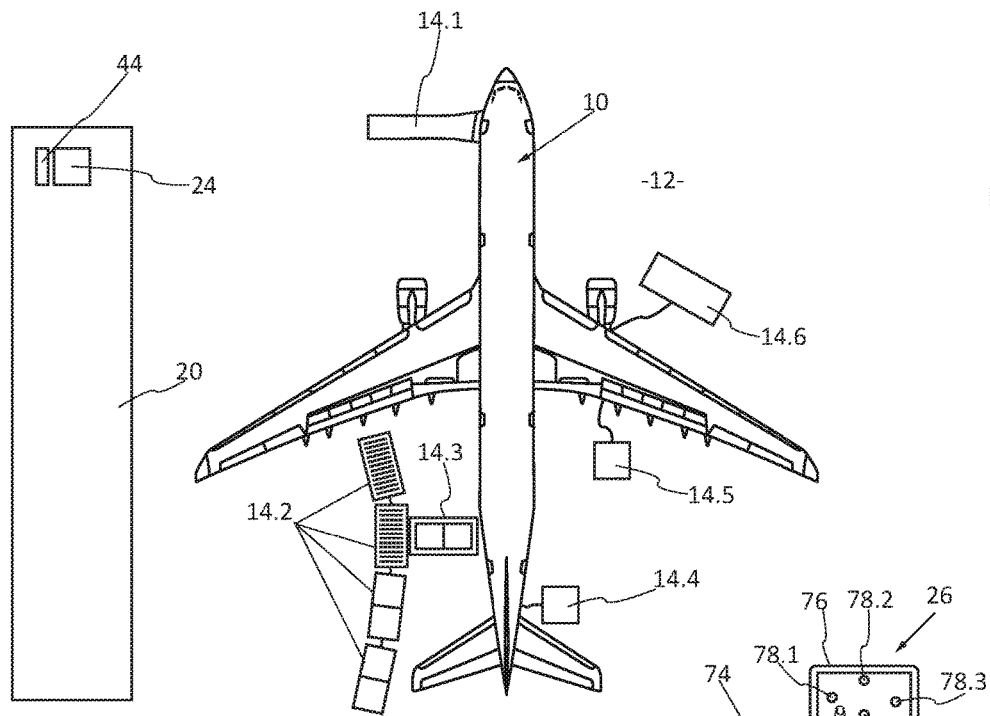
FIG. 1 is a plan view of an aircraft and of various items of ground support equipment positioned on an airport stand.

FIG. 1 shows an aircraft 10 immobilized on an airport stand 12 and various items of ground support equipment 14.1 to 14.6.

Figure 5:
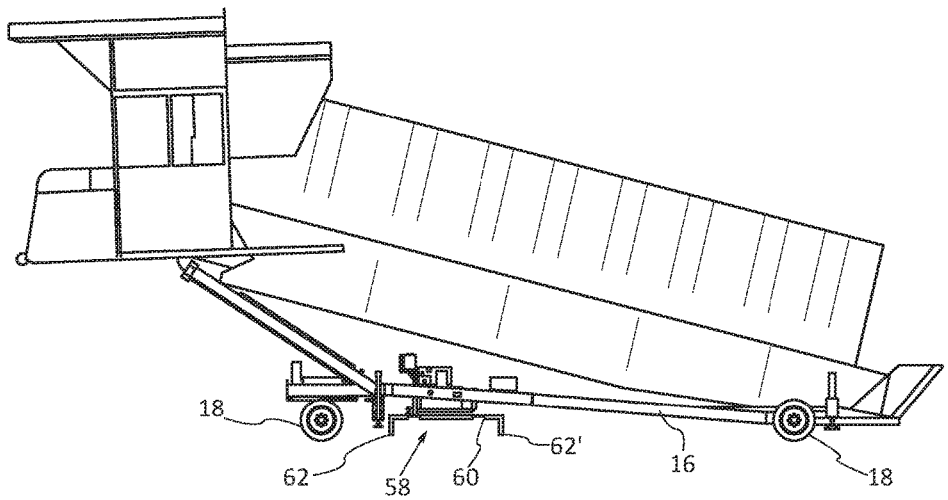
FIG. 5 is a side view of a stairway configured for being maneuvered by the moving apparatus visible in FIG. 2.

According to one embodiment shown in FIG. 5, the ground support equipment 14.1 is a stairway for allowing passengers on the ground to access the aircraft.

Figure 7:
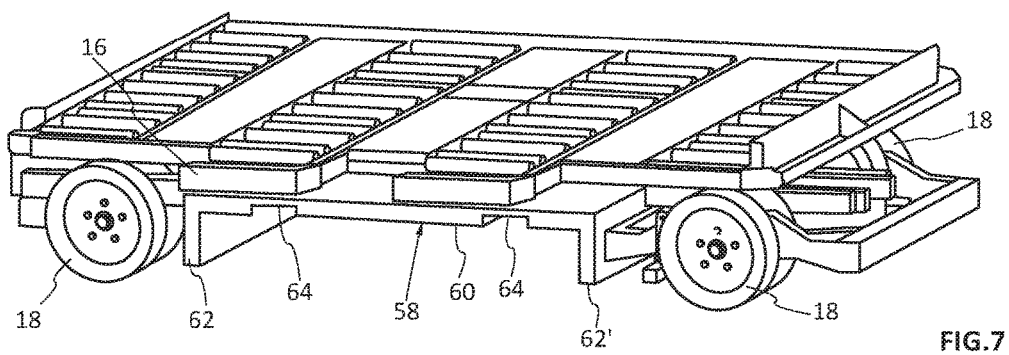
FIG. 7 is a perspective view of a trolley configured for being maneuvered by the moving apparatus visible in FIG. 2.
Figure 8:
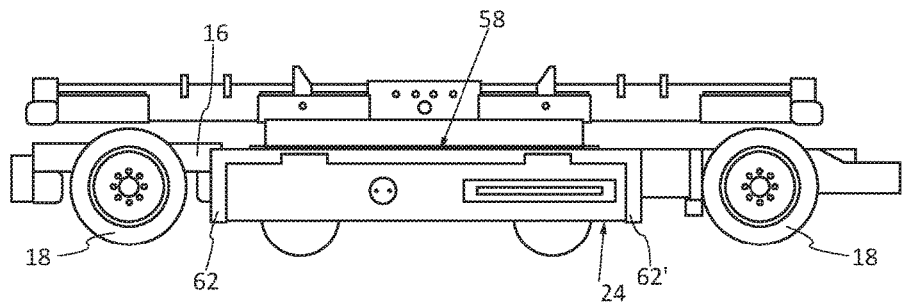
FIG. 8 is a side view showing a moving apparatus coupled with the trolley shown in FIG. 7.

According to another embodiment shown in FIG. 7, the ground support equipment 14.2 is a trolley for baggage containers.

The invention is not, of course, limited to these two embodiments and can be suitable for all of the items of ground support equipment used on airport stands.

Whatever the variant may be, an item of ground support equipment 14.1 to 14.6 comprises a travelling chassis 16 supported by wheels 18.

When it is not in use, each item of ground support equipment 14.1 to 14.6 is stored on a storage area 20. Depending on the case, several items of ground support equipment 14.1 to 14.6 are stored on the same storage area 20.

According to one embodiment, the ground support equipment comprises at least one onboard system making it possible to collect at least one item of information and/or at least one electrical system necessitating an electrical power supply in order to operate. By way of example, the ground support equipment 14.1 comprises a position sensor making it possible to detect the position of the ground support equipment with respect to an aircraft.

Figure 6:
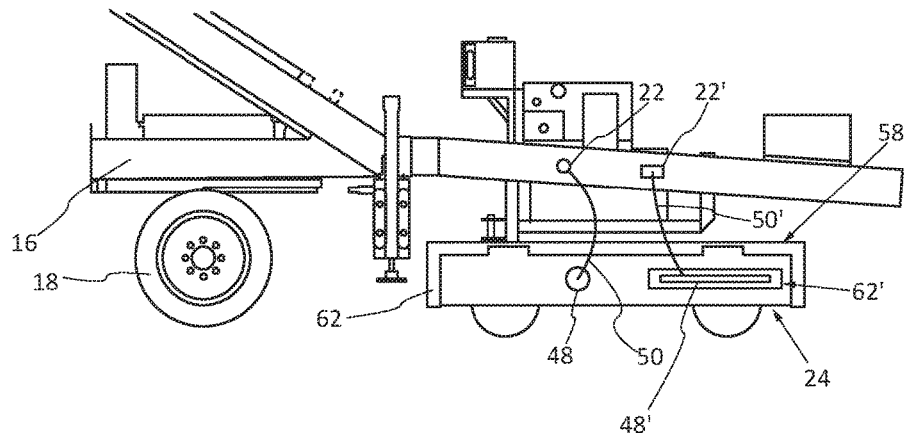
FIG. 6 is a detailed view showing a moving apparatus coupled to the stairway shown in FIG. 5.

Preferably, the ground support equipment comprises at least one connector for supplying the onboard system or systems with electrical energy and/or for transferring data collected by the onboard system or systems. According to one embodiment shown in FIG. 6, the ground support equipment comprises a first connector 22 for supplying it with electrical energy and a second connector 22' for transferring data.

According to one configuration, the ground support equipment comprises a braking system configured for immobilizing at least one wheel 18 in rotation.

Figure 2:
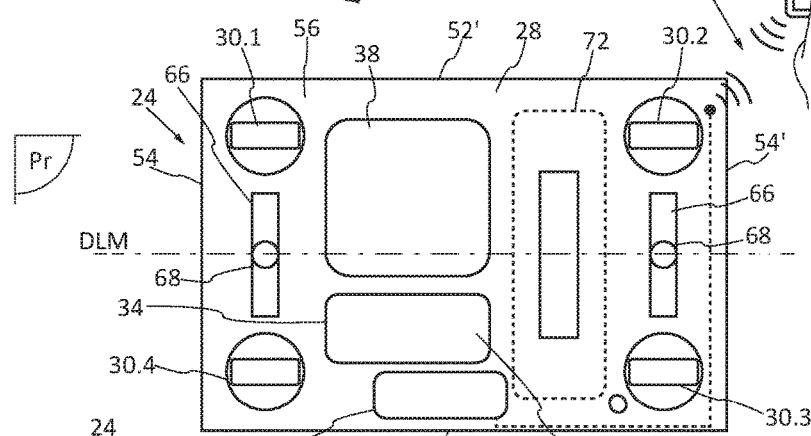
FIG. 2 is a plan view of a device for maneuvering an item of ground support equipment which illustrates one embodiment of the invention.

FIG. 2, shows a device for maneuvering an item of ground support equipment which comprises a motorized moving apparatus 24, controlled remotely and configured so that it can be coupled to an item of ground support equipment and a remote control 26 configured for remotely controlling the moving apparatus 24.

The moving apparatus 24 comprises a travelling chassis 28 supported by wheels 30.1 to 30.4.

For the continuation of the description, a reference plane Pr is parallel with the ground.

At least one of the wheels is orientable. For this purpose, the orientable wheel is connected to the chassis 28 by a link pivoting about a pivoting axis 32 perpendicular to the reference plane Pr. This configuration allows the moving apparatus to follow a curved trajectory.

According to one configuration, all of the wheels 30.1 to 30.4 are orientable.

Figure 3:
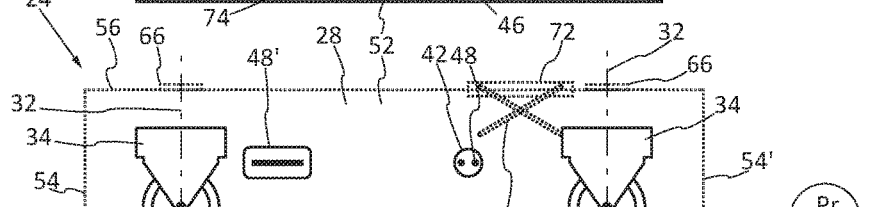
FIG. 3 is a side view of the moving apparatus for maneuvering an item of ground support equipment visible in FIG. 2.
Figure 4:
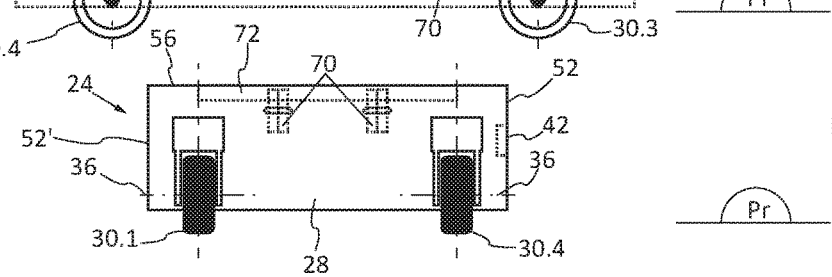
FIG. 4 is a front view of the moving apparatus for maneuvering an item of ground support equipment visible in FIG. 2.

According to an embodiment, shown in FIGS. 3 and 4, for each orientable wheel, the wheel is connected to a yoke 34 by means of an axis of rotation 36 parallel to the reference plane Pr and each yoke 34 is connected to the chassis 28 by a pivoting axis 32 perpendicular to the reference plane Pr. An actuator is interposed between the chassis 28 and the yoke 34 in order to cause its pivoting about the pivoting axis 32.

At least one wheel 30.1 to 30.4 is a driving wheel. For this purpose, the moving apparatus 24 comprises at least one motorization configured for driving the wheel in rotation.

Whatever the variant may be, the moving apparatus 24 comprises a movement system which comprises wheels 30.1 to 30.4, at least one steering mechanism for orienting at least one wheel and at least one motor for driving at least one wheel in rotation.

Advantageously, the steering mechanism or mechanisms and the motor or motors are electrical and the moving apparatus 24 comprises at least one battery 38 for supplying them with electrical energy. Preferably, the moving apparatus 24 comprises a system for recharging the battery or batteries 38. According to one embodiment, the moving apparatus 24 comprises a connector 42 for connecting the recharging system to an electrical power supply.

Advantageously, the device for maneuvering an item of ground support equipment comprises at least a base 44 for storing the moving apparatus 24 when it is not in use.

This base 44 is preferably situated on the airport stand 12, for example, in the ground support equipment storage area 20.

Advantageously, the base 44 comprises a system for recharging the moving apparatus 24 with electrical energy. According to one embodiment, the base 44 comprises a connector configured for being connected to a connector 42 of the moving apparatus 24 in order to recharge its batteries.

The steering mechanism or mechanisms and the motor or motors are controlled by a controller 46 integral with the chassis 28.

Advantageously, the moving apparatus 24 comprises at least one positioning sensor.

According to a first variant, the positioning sensor is a satellite navigation and positioning sensor, of the GPS type, for example, making it possible to determine the positioning coordinates of the moving apparatus 24 in a system of reference axes.

According to a second variant, the positioning sensor is a trajectory following sensor configured to follow a trajectory on the ground. According to one embodiment, the trajectory following sensor is a sensor of the RFID type configured for detecting beacons of the RFID chip type installed in or on the ground according to a trajectory to be followed. According to another embodiment, the trajectory following sensor is a camera which, associated with image recognition software, makes it possible to detect markings on the ground. According to another embodiment, the trajectory following sensor is an electromagnetic sensor configured for detecting a wire positioned in the ground and according to a trajectory to be followed. Other solutions can be envisaged for the trajectory following sensor.

According to a third variant, the positioning sensor is a sensor for detecting the position of an item of ground support equipment. This type of sensor makes it possible to refine the position of the moving apparatus 24 with respect to an item of ground support equipment. According to one embodiment, the detection sensor is an optical or ultrasonic sensor. However, other solutions can be envisaged for the sensor for detecting the position of an item of ground support equipment.

Advantageously, the moving apparatus 24 comprises at least one anti-collision sensor. According to one embodiment, the moving apparatus 24 comprises several anti-collision sensors, such as, for example, optical or ultrasonic sensors, distributed around the periphery of the moving apparatus 24.

According to one configuration, the positioning sensor or sensors inform the controller 46 which, as a function of the information received, determines the information to be transmitted to the steering mechanism or mechanisms and/or to the motor or motors of the moving apparatus.

Preferably, the moving apparatus 24 comprises at least one connection with the ground support equipment to which it is coupled, in order to ensure an exchange of information between the moving apparatus and the ground support equipment and/or for supplying the ground support equipment with electrical energy.

According to a first variant, each connection is of the wired type. According to one embodiment, the moving apparatus comprises a first connector 48 for connecting a first lead 50 connected to the first connector 22 of the ground support equipment and a second connector 48' for connecting a second lead 50' connected to the second connector 22' of the ground support equipment.

According to another variant, at least one of the connections is a wireless connection. According to one embodiment, the transfer of information between the moving apparatus 24 and the ground support equipment is obtained by a wireless connection operating with a communication protocol, such as Wi-Fi, Bluetooth, or the like. The electrical power supply can be of the inductive type.

According to a feature of the invention, the moving apparatus 24 comprises a system for coupling with the ground support equipment. Preferably, the moving apparatus 24 has dimensions allowing it to be positioned under the ground support equipment to which it has to be coupled.

According on one embodiment, the moving apparatus 24 has a height above the ground less than or equal to 45 cm so that it is able to slip under an item of ground support equipment.

Preferably, the moving apparatus 24 has a parallelepiped shape. For the continuation of the description, the longitudinal direction of the moving apparatus DLM is parallel to the longest sides of the moving apparatus in a horizontal plane. The longitudinal direction of the moving apparatus DLM is parallel to the forward or backward movements of the moving apparatus 24.

According to one embodiment, the moving apparatus comprises two side faces 52, 52' parallel with each other and with the longitudinal direction of the moving apparatus DLM, a front face 54 and a rear face 54', parallel with each other and perpendicular to the longitudinal direction, and a substantially horizontal upper face 56. The connectors 48, 48' are preferably positioned on one of the side faces 52 or 52'.

According to another feature, the moving apparatus 24 and the ground support equipment have complementary shapes to ensure their coupling. Preferably, each item of support equipment comprises in its bottom part a connecting plate 58 which is attachable to the ground support equipment, and has shapes complementary to those of the moving apparatus 24.

According to one embodiment, the connecting plate 58 of each item of ground support equipment 14.1 to 14.6 comprises a bottom face 60, a first flange 62 positioned at the front and a second flange 62' placed at the rear parallel with each other, substantially perpendicular to the bottom face 60, and which extend from the bottom face 60 towards the ground.

The flanges 62 and 62' are spaced by a distance substantially equal (with a sliding clearance) to the distance separating the front 54 and rear 54' faces of the moving apparatus 24. Thus, when the moving apparatus 24 is positioned between the flanges 62 and 62', it is immobilized with respect to the ground support equipment in the longitudinal direction.

In addition to the flanges 62 and 62' or alternatively, as shown in FIG. 7, the bottom face 60 of the plate comprises at least one straight groove 64, parallel with the flanges 62 and 62', and the moving apparatus 24 comprises, for each groove 64, a rib 66 protruding with respect to the top face 56 of the moving apparatus 24, which extends perpendicular to the longitudinal direction of the moving apparatus DLM and which has a cross-section substantially equal, with a sliding clearance, to that of the groove 64. According to one embodiment, the bottom face 60 of the connecting plate 58 comprises two grooves 64 parallel with each other and the top face 56 of the moving apparatus 24 comprises two ribs 66, spaced so that each one cooperates with a groove 64.

Advantageously, the coupling system of the moving apparatus 24 comprises at least one centering pin 68 positioned on an outer surface of the moving apparatus 24 facing the ground support equipment like the upper face 56 the moving apparatus. Complementary to this, the lower face 60 of the plate 24 comprises a housing whose cross-section is equal to that of the centering pin 68 such that the moving apparatus 24 and the ground support equipment are immobilized with respect to each other in a horizontal plane when the centering pin is inserted in the housing. The centering pin 68 is mobile in a direction perpendicular to the upper face 56 of the moving apparatus between a retracted position in which the centering pin 68 is entirely housed in a reinforcement with respect to the outer surface of the moving apparatus so that the moving apparatus 24 can slip under the ground support equipment and a deployed position in which the centering pin 68 protrudes with respect to the external surface of the moving apparatus 24 and penetrates into the housing of the connecting plate 58 in such a way as to couple the moving apparatus 24 with the ground support equipment.

According to one configuration, the centering pin 68 comprises an actuator allowing it to move from the deployed position to the retracted position and vice versa, the actuator being controlled by the controller 46.

According to another feature, the coupling system of the moving apparatus 24 comprises at least one lifting platform 72 configured for moving between a high position and a low position, in a direction perpendicular to the upper face 56 of the moving apparatus 24. According to one embodiment, an electrical actuator 70 is provided for moving the platform 72 from the retracted position to the deployed position or vice versa. Advantageously, this actuator 70 is controlled by the controller 46.

When the moving apparatus 24 is positioned under the connecting plate 58 of the ground support equipment and the platform 72 is positioned in the high position, the platform 72 in contact with the bottom face 60 of the connecting plate 58 applies an upward force onto the ground support equipment. In this situation, the ground support equipment being slightly raised, its braking system is deactivated, the ground support equipment is immobilized with respect to the moving apparatus 24 and the grip between the wheels of the moving apparatus 24 and the ground is increased.

According to another feature, the device for maneuvering an item of ground support equipment comprises at least software which allows the controller 46, on the basis of information transmitted by the remote control 26 and/or the positioning sensor or sensors, to control the system for moving the moving apparatus in such a way that the moving apparatus moves autonomously and automatically from a first point to a second point. According to one embodiment, the software makes it possible, on the basis of an instruction, to move the moving apparatus 24 according to at least one pre-established trajectory. Preferably, the software comprises or is coupled with a database listing pre-established trajectories. According to one embodiment, the database associates each pre-established trajectory with an identifier of an item of ground support equipment, an identifier of an aircraft, an identifier of a parking area of an aircraft and an identifier of a storage area of the moving apparatus. Thus, on the basis of all of these identifiers, the database can determine the pre-established trajectory to be followed. On the basis of this pre-established trajectory to be followed, the software can control the controller 46 in such a way that the moving apparatus 24 follows the pre-established trajectory.

According to one configuration, the software is implemented in the controller 46.

The device for maneuvering an item of ground support equipment comprises a wireless communication system 74 providing an exchange of information between the moving apparatus 24 and the remote control 26. Preferably, the communication system 74 uses a communication protocol of the Wi-Fi type.

According to another feature of the invention, the remote control 26 is a device 76 with a touch screen upon which virtual buttons 78.1 to 78.4 are shown (visible in FIG. 2). The device 76 can be a touch tablet, a smartphone, etc.

Each of the virtual buttons 78.1 to 78.4 is dedicated to an instruction.

Thus, a first button 78.1 makes it possible to initiate the movement of the moving apparatus in a first direction, a second button 78.2 makes it possible to stop the movement of the moving apparatus 24, a third button 78.3 makes it possible to deploy or to lower the platform 72 of the moving apparatus 24 and a fourth button 78.4 makes it possible to initiate the movement of the moving apparatus in a second direction opposite to the first direction. When there are four virtual buttons 78.1 to 78.4, they are arranged at the points of a diamond shape, a square or a rectangle.

According to another configuration, the device 76 is used by an operator for remotely managing the movements of the moving apparatus 24.

The invention is not, of course, limited to this configuration for the remote control 26. Thus, the touch screen of the device 76 can display different screens for:

entering the various identifiers (identifier of the ground support equipment, identifier of the aircraft, identifier of the parking area of the aircraft, identifier of the storage area of the moving apparatus), controlling the movements of the moving apparatus (for example, display of buttons for initiating the movement or the stopping of the moving apparatus, of a virtual joystick virtual for steering the movements of the moving apparatus), controlling the coupling system (display, for example, of buttons for controlling the position of the centering pin and of the lifting platform), displaying and validating the trajectories of the moving apparatus, displaying the state of charge of the batteries of the moving apparatus, and initiating the return to the base for recharging the batteries.

This list is not exhaustive.

According to another feature, a single remote control 26 can control several moving apparatuses 24 and/or the same moving apparatus 24 can be controlled successively by several remote controls 26.

For this purpose, each moving apparatus 24 and each remote control comprises an identifier.

The coupling of the remote control and the moving apparatus is obtained using the communication protocol.

According to one embodiment, the device 76 comprises adjustments making it possible to identify another device operating with the same communication protocol and to select it in order to obtain a coupling of the remote control and the moving apparatus.

Preferably, the device 76 comprises an application which allows it to remotely control the moving apparatus 24.

According to one operating mode, the moving apparatus 24 is stored at the level of the base 44, the connector 42 of the moving apparatus 24 being connected to an electrical power supply so as to recharge its battery 38.

As soon as an item of ground support equipment must be moved close to an aircraft, the moving apparatus 24 moves in such a way as to position itself under the ground support equipment.

According to a first variant, this movement is carried out automatically and is initiated by means of a simple start instruction, the moving apparatus 24 knowing its initial position, its final position and knowing the trajectory to be followed between the initial and final positions.

According to another variant, this movement is controlled remotely by an operator using the remote control 26 for remotely steering the moving apparatus 24.

When the moving apparatus 24 is positioned under the ground support equipment, the operator commands the deployment of the centering pin or pins 68. He then connects the ground support equipment and the moving apparatus with the leads 50 and 50' so that the onboard system is powered with electrical energy and communicates data to the controller 46 of the moving apparatus 24.

As exchanged data, the ground support equipment communicates its identifier to the moving apparatus 24 in order to be identified by the latter. The moving apparatus 24 then transmits a message to the remote control 26 indicating that it has recognized the ground support equipment.

The platform 72 is then moved into the high position. From then onwards the ground support equipment can be moved by the moving apparatus 24 from its initial position into a final position.

As before, according to a first variant, the movement of the ground support equipment from the initial position to the final position is carried out automatically and is initiated by means of a simple start instruction. The moving apparatus 24 moves autonomously thanks to the data transmitted by its sensors to the controller 46. These data can be completed by data collected by a sensor or sensors positioned on the ground support equipment and transmitted to the controller 46. Thus, in the case of a stairway 14.1, a position sensor integral with the stairway can detect the presence of the fuselage of the aircraft so that the moving apparatus 24 stops its movement when the distance between the stairway 14.1 and the aircraft is less than a given value.

According to another variant, the movement of the ground support equipment from the initial position to the final position is controlled by an operator using the remote control 26 for remotely steering the moving apparatus 24.

The remote control 26 can be used for controlling the braking and onboard systems of the ground support equipment via the controller 46. Thus, the remote control 26 can be used for activating or deactivating the braking system of the ground support equipment or for controlling other systems of the ground support equipment such as, for example, the deployment of stabilizing struts in the case of a stairway 14.1.

Afterwards, the platform 72 is moved into the low position. After disconnecting the leads 50 and 50', a command can be given for initiating the return of the moving apparatus 24 to its base 44.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

What is claimed is:

1. A device for maneuvering ground support equipment on an airport stand, the device comprising:

a moving apparatus having a system configured for coupling with the ground support equipment, and for maneuvering the ground support equipment according to a predetermined trajectory; and a remote control configured for remotely controlling the movements of the moving apparatus according to the predetermined trajectory, wherein the moving apparatus comprises at least one connection with an item of ground support equipment for providing an exchange of data between the moving apparatus and the ground support equipment, wherein the data is communicated from the ground support equipment to the moving apparatus and corresponds to a ground support identifier wherein the predetermined trajectory is determined from the identifier.

2. The device according to claim 1, wherein the moving apparatus has dimensions to be positioned under the connecting plate connected to the ground support equipment.

3. The device according to claim 1, wherein the coupling system comprises at least one centering pin which is mobile between a retracted position in which the centering pin is entirely housed inside a reinforcement with respect to an outer surface of the moving apparatus and a deployed position in which the centering pin protrudes with respect to the outer surface in such a way as to obtain a coupling of the moving apparatus and the ground support equipment.

4. The device according to claim 1, wherein the coupling system comprises at least one platform configured for moving between a low position and a high position in which the platform applies an upward force on the ground support equipment.

5. The device according to claim 1, wherein the moving apparatus comprises an upper face with at least one rib perpendicular to a forward or backward direction of movement of the moving apparatus.

6. The device according to claim 1, wherein the moving apparatus comprises at least one positioning sensor and wherein the device comprises at least software which allows a controller, on the basis of information transmitted by at least one of: the remote control and the positioning sensors, to control the movements of the moving apparatus.

7. A ground support equipment for an airport stand, comprising:

a connecting plate configured for being coupled with a moving apparatus of a maneuvering device, the maneuvering device configured for maneuvering the ground support equipment on the airport stand, the device comprising:

a moving apparatus having a system configured for coupling with the ground support equipment, and for maneuvering the ground support equipment according to a predetermined trajectory; and a remote control configured for remotely controlling the movements of the moving apparatus according to the predetermined trajectory, wherein the moving apparatus comprises at least one connection with an item of ground support equipment for providing an exchange of data between the moving apparatus and the ground support equipment, wherein the data is communicated from the ground support equipment to the moving apparatus and corresponds to a ground support identifier wherein the predetermined trajectory is determined from the identifier.

8. The ground support equipment according to claim 7, wherein the connecting plate is positioned in a bottom part of the ground support equipment and comprises a lower face and parallel first and second flanges extending from the lower face towards the ground.

9. The ground support equipment according to claim 7, wherein the connecting plate comprises at least one housing configured for receiving a centering pin integral with the moving apparatus.

10. The ground support equipment according to claim 7, wherein the connecting plate comprises at least one groove configured for receiving a rib of the moving apparatus.

* * * * *